United States Patent [19]

Barakai et al.

[11] Patent Number: 5,103,079
[45] Date of Patent: Apr. 7, 1992

[54] SYSTEM FOR CONTROLLING THE USE OF PORTABLE DATA MEDIA

[75] Inventors: Simon Barakai, Andresy; Christian Guion, Verrieres Le Buisson, both of France

[73] Assignee: Schlumberger Industries, Montrouge, France

[21] Appl. No.: 371,767

[22] Filed: Jun. 27, 1989

[30] Foreign Application Priority Data

Jun. 28, 1988 [FR] France .................................. 88 08641

[51] Int. Cl.⁵ .............................................. G06K 5/00
[52] U.S. Cl. .................................... 235/380; 235/379; 364/408
[58] Field of Search ............. 235/379, 380, 382, 382.5; 380/24; 340/825.33, 825.35; 364/401, 406, 408

[56] References Cited

U.S. PATENT DOCUMENTS

| | | | |
|---|---|---|---|
| 3,394,246 | 7/1968 | Goldman | 235/380 |
| 4,734,564 | 3/1988 | Boston et al. | 235/380 |
| 4,822,985 | 4/1989 | Boggan et al. | 235/380 |
| 4,870,259 | 9/1989 | Boggan et al. | 235/380 |
| 4,908,521 | 3/1990 | Boggan et al. | 235/380 |
| 4,943,707 | 7/1990 | Boggan | 235/380 |

FOREIGN PATENT DOCUMENTS 0200343 11/1986 European Pat. Off. .
0127424 5/1987 European Pat. Off. .
0274191 7/1988 European Pat. Off. .

Primary Examiner—Stuart S. Levy
Assistant Examiner—Steven M. duBois
Attorney, Agent, or Firm—Frishauf, Holtz, Goodman & Woodward

[57] ABSTRACT

The invention relates to making use of a "black" list in a system where goods or services are provided in response to a memory card being presented. The complete "black" list is stored in the memory (46) of a computer center (40). The identification numbers of the cards are subdivided into a plurality of classes. The memory (28) of each local terminal (10) stores the ranks of classes having at least one identification number on the "black" list.

2 Claims, 2 Drawing Sheets

SYSTEM FOR CONTROLLING THE USE OF PORTABLE DATA MEDIA

The present invention relates to a system for controlling the use of portable data media.

More precisely, the invention relates to such a system in which each portable data medium, e.g. a card having an electronic or a magnetic memory, includes identification data specific to the card, referred to herein as the medium's identification number. When such cards give access to goods or services, it is necessary, prior to authorizing the supply of such goods or services, to verify that the card number is not on a stop list, commonly called the "black" list. This list is maintained by the organization which controls use of the cards and it contains the numbers of all those cards which have been banned. This may be due to the fact that the card has been declared lost or stolen by its legitimate holder. It may also be due to the fact that the card, although being used by its legitimate holder, has nevertheless been used for obtaining goods or services for amounts that exceed a credit limit associated with the card.

In order to obtain goods or services, the card holder inserts the card into a reader which performs various checks on the information stored in the card and then either authorizes or does not authorize the provision of goods or services as a function of the checks performed.

One of the checks, in particular, consists in checking to see whether the card has been stopped, i.e. whether it is on the "black" list. There are two main ways in which this check may be performed: It may be performed by local checking. In this case, the card reader contains the "black" list in its memory. Since the memory capacity of a card reader or the system controlling it are necessarily limited, the local "black" list is necessarily short and as a result checking is not very effective. Alternatively, the check may be performed centrally. In this case card readers are permanently connected on-line to a computer center which controls the "black" list. Such a system is effective in that the computer center has all the numbers of stopped cards in its memory. However it is cumbersome in that a permanent link is required between each reader and the center, and each time a card is inserted in a reader data must be interchanged between the reader and the computer center.

In addition, it takes a long time to compare a card number with all of the numbers on the "black" list.

An object of the invention is to provide a system for controlling stop lists which is quicker and less cumbersome than prior systems while still enabling a high degree of security to be obtained even when using stop lists which include very large numbers of cards.

According to the invention, this object is achieved by a system for controlling the use of portable data media, the system comprising:

a plurality of removable portable data media, each including an identification number;

a plurality of local processing devices for reading identification numbers from said media;

a computer center; and means for transmitting data in both directions between said computer center and said local processing devices;

said computer center including means for storing a "black" list of stopped identification numbers, means for comparing a received identification number with the identification numbers in said "black" list, and means for transmitting information concerning the results of the comparison; and each local processing device includes means for storing classes of identification numbers, and for storing a first status for each class when none of the identification numbers in that class appears on the "black" list, and a second status when at least one of the identification numbers in that class appears on the "black" list, means for associating uniquely and in a preestablished manner each identification number read from said portable data media with one of said classes, means for transmitting said identification number to said computer center if the number belongs to a class in said second state, and means for generating an alarm if said information concerning the result of the comparison by the computer center indicates that the identification number contained in the data medium being read does indeed appear in the "black" list.

Preferably, the system also includes means for loading the memory in each local processing device with the status of each class on the basis of the "black" list of identification numbers contained in the computer center.

Also preferably, the "black" list contains identification numbers associated with different levels of seriousness, and said means for loading the local processing devices are controlled to attribute the second status to any given class as a function of a predetermined level of seriousness.

It will thus be understood that two levels of checking are performed. The first level is performed by the reader by consulting a list of classes in the second state, i.e. classes in which at least one card number is on the "black" list. The computer center in which all of the numbers on the "black" list are stored is therefore interrogated only when a card's number falls in one of such "black" list classes. Account can thus be taken of all the card numbers on the black list, but the computer center is actually interrogated only one time in eight on average, assuming that the number of classes containing a stopped number constitutes ⅛th of the total number of classes.

Other characteristics of the invention appear more clearly on reading the following description of a preferred embodiment which is described by way of non-limiting example. The description refers to the accompanying drawings, in which:

FIG. 1 shows a local apparatus 10 for processing data media. Each data medium is constituted by an electronic memory card and the local processing apparatus is referred to below as a processing terminal.

Figure 1:
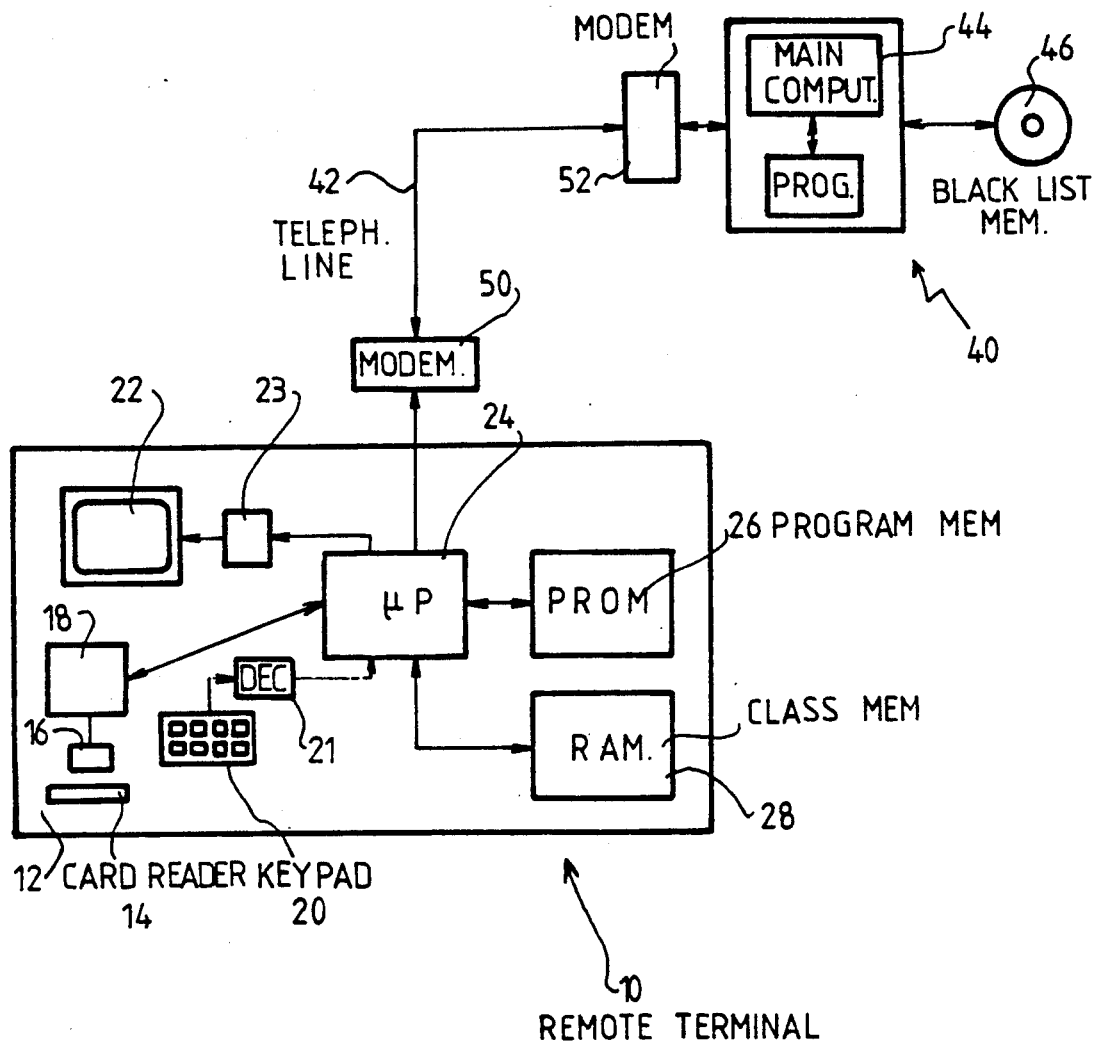
FIG. 1 shows a control system in accordance with the invention, with only one local apparatus being shown in the figure.
Figure 2:
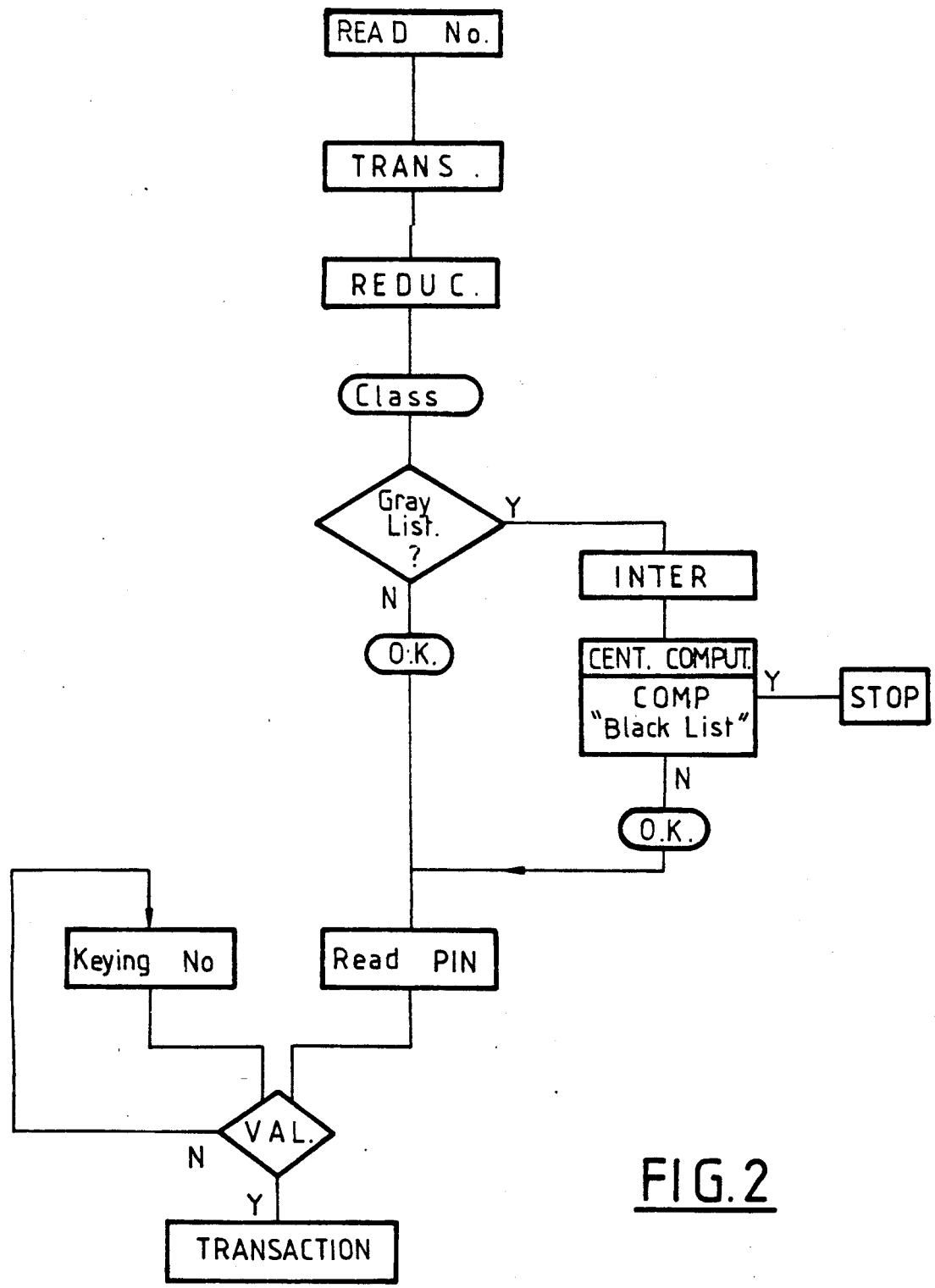
FIG. 2 is a flow chart of the way in which the FIG. 1 system operates.

The terminal 10 includes a memory card read/write device 12 represented by its card insertion slot 14, a processing circuit 18, and a connection system 16 for interconnecting the circuit in the memory card and the processing circuit 18. The terminal 10 also includes a keypad 20 for receiving alphanumeric data and a display device 22, e.g. a liquid crystal display. The terminal 10 is controlled by a microprocessor 24 which controls the above-mentioned members and which is suitable for running programs stored in a program memory 26, e.g. a non-volatile memory (EPROM, EEPROM).

The microprocessor 24 is also associated with a working memory 28, e.g. RAM. The contents of the memory 28 is described below.

The microprocessor 24 is connected to the display 22 via a driver circuit 23. Similarly the keypad 20 is connected to the microprocessor 24 via a decoder 21.

The terminal 10 may be put into communication with a computer center 40 over a telephone type line 42. The computer center 40 is essentially constituted by computer means 44 and a memory 46 containing the entire list of cards currently stopped (i.e. the "black" list). 48 designates a portion of the program memory for the computer means 44 containing programs specific to the system of the present invention. The terminal 10 and the computer center 40 may be interconnected via the line 42 by means of modems 50 and 52.

Returning to the terminal 10, there follows a description in greater detail of the contents of its memories 26 and 28.

Each card has an identification number in its memory, constituted by 19 digits or characters, for example. There are thus $10_{19}$ different possible numbers. Each card has a unique identification number. In the example described, the card also includes a personal identification number (PIN) code in its memory, which code is specific to the card holder. Card numbers are subdivided into N classes in such a manner that each card number belongs to a unique one of the N classes. An example of a transformation is described below suitable for associating each card number with one out of N classes (where N=256,000, for example). With reference to the card numbers on the "black" list, it is possible to partition the set of N classes into two subsets. The first subset comprises all those classes having no card numbers on the "black" list, and the second subset comprises all those classes for having at least one card number on the "black" list. In the description below, classes in this second subset, i.e. classes requiring further verification, are referred to as being "gray".

The status of the various different classes of numbers, i.e. whether the class is "gray" or "clear" is loaded into the memory 28. If the memory 28 contains 256K memory bits, it can store the status of 256,000 classes. If the memory location corresponding to a class is given the value "1" then the class is "gray", and if its value is "0", then the class is "clear". The rank of each class is represented by the address of the corresponding memory location.

The memory 26 contains various programs for implementing the system. In particular it contains programs TRANS and REDUC which are used, as explained below, for converting a card number into the corresponding class number. The program COMP reads the status of a class ("gray" or "clear") from the corresponding address in the memory 28. A program INTER is used for establishing a connection between the terminal 10 and the computer center 40, and for transferring the number of a card to the computer center, and then for receiving the response from the computer center 40 concerning the status of the card number (on the "black" list or not). Finally, a program VAL verifies that the personal identification number keyed in by the user via the keypad 20 does indeed correspond with the number stored in the card.

The computer 44 contains a program CHARGE in its memory 48 suitable for using the numbers in the "black" list stored in memory 46 to generate a table giving the status of each class of numbers, and then transmitting the status table to the terminal 10 for storage in its memory 28. It also has a program COMPAR for comparing a card number with the card numbers stored in the memory 46.

Operation of the system is now described in greater detail. Assume that the memory 28 of terminal 10 already contains the status of all N classes of number. The user inserts a card into the slot 14 of the terminal 10. Once the card reaches the processing position, i.e. once it makes contact with the connector 16, the processing circuit 18 reads the number of the inserted card and transmits it to the microprocessor 24. The microprocessor then causes programs TRANS and REDUC to be run. It thus obtains the rank of the class to which the card number belongs. The microprocessor 24 then causes the program COMP to run. This program reads the location in the memory 28 whose address corresponds to the class rank as determined by the programs TRANS and REDUC. If the memory location is at "0" then the corresponding class does not contain any numbers on the "black" list. This means the number of the card inserted in the terminal 10 is not on the "black" list. The operations that follow under such circumstances are described further on. However, if the memory location is at "1", then the card number belongs to a class containing at least one number on the "black" list. The microprocessor 24 then causes the program INTER to run. The card number is transmitted to the computer center 40 over modems 50 and 52 and line 42. When the computer 44 receives this number, it runs its program COMPAR to check whether the received number appears in the "black" list stored in memory 46. The result of the comparison is transmitted back to the terminal 10 over line 42. If the number is indeed on the "black" list, then that fact is displayed on the display device 22 in order to inform the trader on whose premises the terminal 10 is installed. Otherwise, the card is not on the "black" list and the process may continue.

Once satisfied that the card is not on the "black" list, the terminal 10 invites the card holder to key in the personal number which the terminal has already read from the card memory. If the number keyed is compatible with the number read, then the card is accepted and the user may obtain the desired goods or service. If the numbers are not compatible, the user is invited to key in the personal number again. After a predetermined number of consecutive wrong numbers have been attempted, the card is confiscated. This stage is controlled by the program VAL.

It follows from the above description that the system of the invention for controlling the use of cards presents numerous solutions compared with the two types of solution proposed in the past.

By periodically changing the "gray" classes, it is possible to make further checking by the computer center appear to be pseudo-random, and that is even more dissuasive.

The probability of further checking by the computer center can be adapted to the risk run by each sales point by declaring a greater or smaller quantity of classes of numbers to be "gray".

By virtue of the initial "sorting" performed by the terminal itself, it is possible to take account of "black" lists which are very long.

Finally, looking up which classes are "gray" takes place quasi-immediately, and in any event very much more quickly than direct comparison between a given number and the numbers on the "black" list.

The description above assumes that the card has a PIN code. Naturally, the system may also be applied to cases where the card does not have such a code. It will be understood that in such cases, it is even more important to compare the card number with a complete "black" list.

As described above, the program CHARGE stored in the computer center memory is used for loading the status ("gray" or "clear") of each class of numbers into each terminal on the basis of the complete "black" list contained in the memory 46. The program CHARGE runs the programs TRANS and REDUC for each number in the "black" list. In this way, it determines the rank of each "gray" class. Thereafter, it transmits the status of each class over the line 42 using a process described below. Two cases arise: either the terminal memory is being loaded initially, or else it is being updated. We begin with initial loading. The problem is naturally one of reducing the time taken to transmit the identities of the "gray" classes. Assume that the data is transmitted in ASCII over a line having a transmission speed of 1200 bauds, for example. According to the invention, instead of transmitting the status of each class (1 or 0), the difference between the ranks of two successive "gray" classes is transmitted. The rank difference is expressed as a byte. If the line is capable of transmitting 100 bytes per second, as mentioned above, and if the number of "gray" classes is 32,000, then the transmission time is 5.3 minutes, which is considerably less than the time that would be required for transmitting all of the class statuses as individual bits.

When a status table is already present in the memory 28, but needs updating, either a new "gray" class needs adding (a 0 needs changing into a 1), or else an old one needs removing (a 1 needs changing into a 0). The same principle as that described above is used. However, since the distance between classes that need changing (i.e. the rank difference between successive classes to be changed) is a priori much greater than it was during initial loading, change instructions are coded on two bytes.

A card number may appear on the "black" list for various different reasons of differing degrees of seriousness: the card may be reported as being stolen; the card holder may frequently exceed a credit limit; or a user who is normally a good payer may have exceeded a credit limit exceptionally. When the central "black" list is set up in the memory 46, each number on the "black" list may be associated with a code representing different levels 1, 2, 3, etc. of seriousness. When loading the "black" list for the purpose of updating the "gray" classes in the memory 28 of the terminal, it is possible to take account of some levels of seriousness only when defining "gray" classes, with levels being selected as a function of characteristics of the site where the terminal is installed. This means that the frequency of calls requiring the full "black" list to be consulted can be reduced from sites which are relatively secure, while on the contrary it can be increased from terminals installed on sites which are treated as being insecure.

The overall purpose of the programs TRANS and REDUC is to associate each card identification number with a unique class number. The program TRANS uses a bijective mapping f to associate any card number x with another card number y. For example, f could define a permutation of the digits constituting the card number. The program REDUC serves to associate a card number with one and only one of the N classes of card number. If the corresponding function is called g, and the number of the card is y, then:

$$g(y) = z$$

where z is the class number. For M possible card numbers, M is naturally greater than N. The function g may be constituted, for example, by modulo-N division of the card number, with the remainder after division specifying the class number.

To sum up, if x is the number of a card, the number z of the class to which it belongs is given by:

$$z = g(f(x)).$$

We claim:

1. A system for controlling the use of portable data media, the system comprising:
   a plurality of removable portable data media, each including an identification number;
   a plurality of local processing devices for reading identification numbers from said media;
   a computer center; and
   means for transmitting data in both directions between said computer center and said local processing devices;
   said computer center including means for storing a black list of stopped identification numbers in a plurality of ranked classes of identification numbers with each class having a first status when none of the identification numbers in that class appears on the black list, and a second status when at least one of the identification numbers in that class appears on the black list, means for comparing a received identification number with the identification numbers in said black list, and means for transmitting information concerning the results of the comparison; and
   each local processing device includes memory means for storing said plurality of classes of identification numbers, and for storing for each class said first status or said second status, means for associating uniquely and in a preestablished manner each identification number read from said portable data media with one of said classes, means for transmitting said identification number to said computer center if the number belongs to a class having said second status, and means for generating an alarm if said information concerning the result of the comparison by the computer center indicates that the identification number contained in the data medium being read is included in the black list, said memory means including a plurality of memory locations each of which is specified by an address, each address being associated with a different one of said plurality of classes, the value stored in each of said memory locations representing the status of the associated class;
   said computer center further including means for loading the status of each class stored in the storing means of the computer center into said memory means of each said local processing device by sending to each said local processing device a difference information signal related to the difference between ranks of two consecutive classes having the same status; and
   said local processing device including means for writing into addresses of the memory means corresponding to said two consecutive classes a value representing the status thereof.

2. A system according to claim 1, wherein the means of said computer center for storing the black list further includes means for storing for each identification number of the black list information corresponding to one of a predetermined number of refusal levels, and the loading means of the computer center comprises means for transmitting the second status information to a local processing device as a function of the refusal information associated with a particular identification number, whereby generation of an alarm depends on the particular refusal level assigned to such particular identification number and circumstances under which its associated portable data medium is being used.

* * * * *